US011854028B2

(12) United States Patent
Kerr et al.

(10) Patent No.: US 11,854,028 B2
(45) Date of Patent: Dec. 26, 2023

(54) REINFORCEMENT LEARNING APPLIED TO SURVEY PARAMETER OPTIMIZATION

(71) Applicant: Microsoft Technology Licensing, LLC, Redmond, WA (US)

(72) Inventors: Matthew Spencer Donald Kerr, Issaquah, WA (US); Shaker Asif Khaleque, Bothell, WA (US); Kelly John Forsmann, Boise, ID (US); Tatiana Shubin, Redmond, WA (US); Dipti A. Patil, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 17/516,681

(22) Filed: Nov. 1, 2021

(65) Prior Publication Data

US 2023/0137708 A1    May 4, 2023

(51) Int. Cl.
*G06Q 30/02* (2023.01)
*G06Q 30/0203* (2023.01)
(Continued)

(52) U.S. Cl.
CPC ....... *G06Q 30/0203* (2013.01); *G06F 18/214* (2023.01); *G06F 18/2178* (2023.01); *G06Q 30/0204* (2013.01)

(58) Field of Classification Search
CPC ........... G06Q 30/0203; G06Q 30/0204; G06K 9/6256; G06K 9/6263
See application file for complete search history.

(56) References Cited

U.S. PATENT DOCUMENTS 10,235,630 B1 * 3/2019 Wu ......................... G06N 7/01
10,643,223 B2    5/2020 Choudhari
(Continued)

FOREIGN PATENT DOCUMENTS

WO    WO-2022204803 A1 * 10/2022

OTHER PUBLICATIONS

S. Pradhan, L. Qiu, A. Parate and K. -H. Kim, "Understanding and managing notifications," IEEE Infocom 2017—IEEE Conference on Computer Communications, Atlanta, GA, USA, 2017, pp. 1-9, doi: 10.1109/INFOCOM.2017.8057231. (Year: 2017).*
(Continued)

*Primary Examiner* — Mehmet Yesildag
*Assistant Examiner* — Jeremy L Gunn
(74) *Attorney, Agent, or Firm* — Schwegman Lundberg & Woessner, P.A.

(57) ABSTRACT

Systems and methods are directed to optimizing survey parameters using machine learning. A network system monitors user activity of a plurality of users with respect to an application and provides a notification to users of the plurality of users that satisfy a trigger condition for providing the notification. The network system obtains feedback corresponding to the notification, whereby the feedback indicates whether each of the users accepted, rejected, or ignored the notification. A machine learning model is then trained using input data obtained from the feedback to optimize on one or more parameters used by the network system in providing a future notification. Based on the machine learning model, the future notification is presented to a further set of users using the one or more optimized parameters.

16 Claims, 7 Drawing Sheets

(51) Int. Cl.
 G06Q 30/0204 (2023.01)
 G06F 18/214 (2023.01)
 G06F 18/21 (2023.01)

(56) References Cited

U.S. PATENT DOCUMENTS

| | | | |
|---|---|---|---|
| 2014/0229614 A1* | 8/2014 | Aggarwal | H04L 65/1063 709/224 |
| 2017/0091787 A1* | 3/2017 | Choudhari | G06F 16/245 |
| 2018/0032616 A1* | 2/2018 | Wang | G06Q 30/0282 |
| 2018/0285102 A1* | 10/2018 | Sachdev | G06Q 30/0203 |
| 2019/0066136 A1* | 2/2019 | Kopikare | G06F 40/30 |
| 2020/0327506 A1* | 10/2020 | Litman | G06Q 10/1053 |
| 2021/0201175 A1* | 7/2021 | Ou | G06N 5/04 |

OTHER PUBLICATIONS

"Personalizer", Retrieved from: https://web.archive.org/web/20210423010146/https://azure.microsoft.com/en-us/services/cognitive-services/personalizer/, Apr. 23, 2021, 13 Pages.

Agarwal, A., et al., "Multiworld Testing Decision Service: A System for Experimentation, Learning, And Decision-Making", In Whitepaper of Microsoft, Oct. 2016, pp. 1-40.

* cited by examiner

REINFORCEMENT LEARNING APPLIED TO SURVEY PARAMETER OPTIMIZATION

TECHNICAL FIELD

The subject matter disclosed herein generally relates to surveys. Specifically, the present disclosure addresses systems and methods that optimize survey parameters using reinforcement (machine) learning.

BACKGROUND

Conventionally, many companies send out surveys to users and try to obtain feedback, which is used to improve their products or make better strategic decisions. How, when, or how frequently a company provides a survey can impact how many users will response and how they will respond. Traditionally, companies picked these survey parameters by intuition, experience, or based on expert recommendations on best practices. However, such methods for selecting survey parameters are not highly systematic or tailored to detailed, individual circumstances.

BRIEF DESCRIPTION OF THE DRAWINGS

Some embodiments are illustrated by way of example and not limitation in the figures of the accompanying drawings.

DETAILED DESCRIPTION

Figure 1:
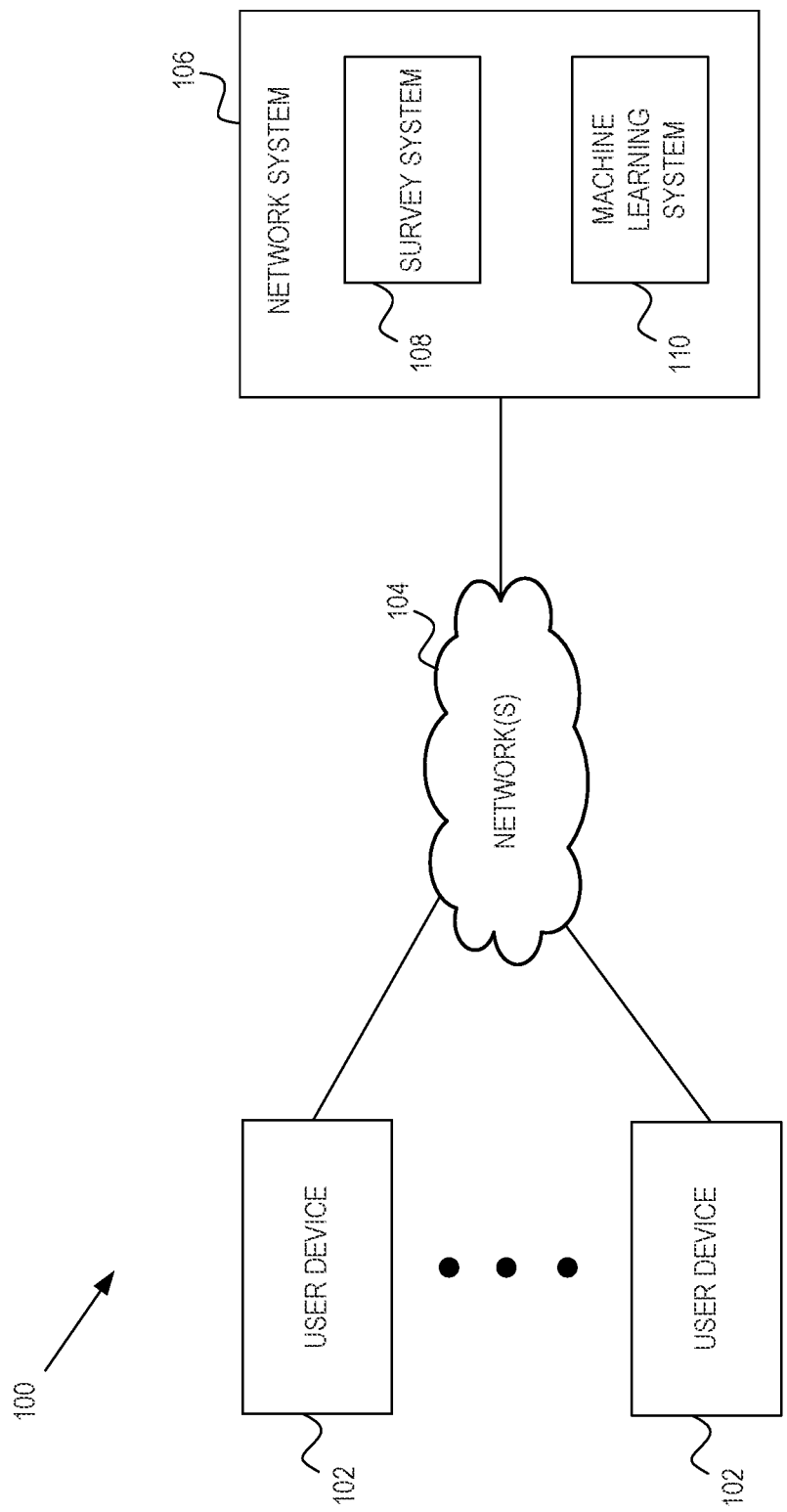
FIG. 1 is a diagram illustrating a network environment suitable for optimizing survey parameters using machine learning, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

When providing surveys, there are many parameters than can be refined in order to balance, for example, when to provide a survey, how often to provide a survey, and contents of the survey. Example embodiments provide a systematic way to optimize presentation of a notification or survey prompt to ensure that users are notified/asked at the right time and in the right way without any biases of individual, human decision making. The example embodiments use machine (reinforced) learning to optimize survey parameters that govern when and how to ask users to participate in a survey or provide some other form of a response/feedback.

In example embodiments, a network system monitors user activity of a plurality of users with respect to an application and provides a notification to users of the plurality of users that satisfy a trigger condition for providing the notification. In one embodiment, the notification is a survey prompt. The network system obtains feedback corresponding to the notification, whereby the feedback indicates whether each of the users accepted, rejected, or ignored the notification. A machine learning model is then trained using input data obtained from the feedback to optimize on one or more parameters used by the network system in providing a future notification. Based on the machine learning model, the future notification is presented to a further set of users using the one or more optimized parameters.

As a result, one or more of the methodologies described herein facilitate solving the technical problem of optimizing survey parameters and presenting survey prompts based on optimized survey parameter(s). Specifically, the survey parameters are optimized (e.g., for maximizing survey prompt acceptance) using a machine learning model that is trained based on data associated with past acceptance of survey prompts. The optimized survey parameter(s can then be applied to future survey campaigns. As such, one or more of the methodologies described herein may obviate a need for certain efforts or computing resources that otherwise would be involved, for example, in repeatedly presenting survey prompts that are consistently rejected or ignored. Examples of such computing resources include processor cycles, network traffic, memory usage, data storage capacity, power consumption, network bandwidth, and cooling capacity.

FIG. 1 is a diagram illustrating a network environment 100 suitable for optimizing survey parameters using machine learning, in accordance with example embodiments. In example embodiments, a plurality of user devices 102 are communicatively coupled via a network 104 to a network system 106 that manages surveys. Each user device 102 is a device of a user who is using one or more applications (e.g., web-based applications that are a part of Microsoft Office 365) provided by or associated with the network system 106. For example, the applications can include a word processing application, a spreadsheet application, a presentation application, and/or an email application. The user device 102 may comprise, but is not limited to, a smartphone, tablet, laptop, multi-processor systems, microprocessor-based or programmable consumer electronics, game consoles, set-top boxes, a server, or any other communication device that can generate documents and can access the network 104.

Depending on the form of the user device 102, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched. telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WIMAX) connection, or another type of wireless data connection. In some embodiments, the network 104 includes one or more wireless access points coupled to a local area. network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The network system 106 provides surveys via the communication network 104 (e.g., the Internet, wireless network, cellular network, or a Wide Area Network (WAN)) to the user devices 102. During runtime, a survey system 108 of the network system 106 works with a machine learning system 110 to determine one or more optimized survey parameters to apply to a survey campaign. Specifically, the one or more optimized survey parameters are determined by applying features (e.g., characteristics) of a survey campaign to be presented to a machine-learning model. The optimized survey parameter(s) are then applied to the survey campaign. A survey prompt can then be presented to users at their respective user devices 102 based on the users satisfying conditions required to trigger the display of the survey prompt. In one embodiment, the survey prompt asks the users if they are willing to answer one or more questions.

The users can choose to ignore, accept, or reject the survey prompt. Ignoring the survey prompt occurs when the user performs no action when the survey prompt is shown and simply lets the survey prompt time out and disappear. Accepting the survey prompt comprises the user selecting an icon on the survey prompt to respond to the survey. Rejecting the survey prompt comprises the user selecting an icon on the survey prompt indicating no interest in responding to the survey. Each user's response to the survey prompt is recorded and used to retrain the machine learning model.

The survey system 108 will be discussed in more detail in connection with FIG. 2 below. Additionally, the machine learning system 110 will be discussed in more detail in connection with FIG. 3 below.

In example embodiments, any of the systems, devices, or machines (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 or their functionality (e.g., the functionalities of the survey system 108, the machine learning system 110) may be combined, or the functions described herein for any single component may be subdivided among multiple components. Additionally, any number of user devices 102 may be embodied within the network environment 100. While only a single network system 106 is shown, alternative embodiments contemplate having more than one network system 106 to perform the operations discussed herein (e.g., each localized to a particular region). Additionally, while the survey system 108 and the machine learning system 110 are shown within the network system 106, the survey system 108 and the machine learning system 110 can be in separate network systems or be located elsewhere in the network environment 100.

Figure 2:
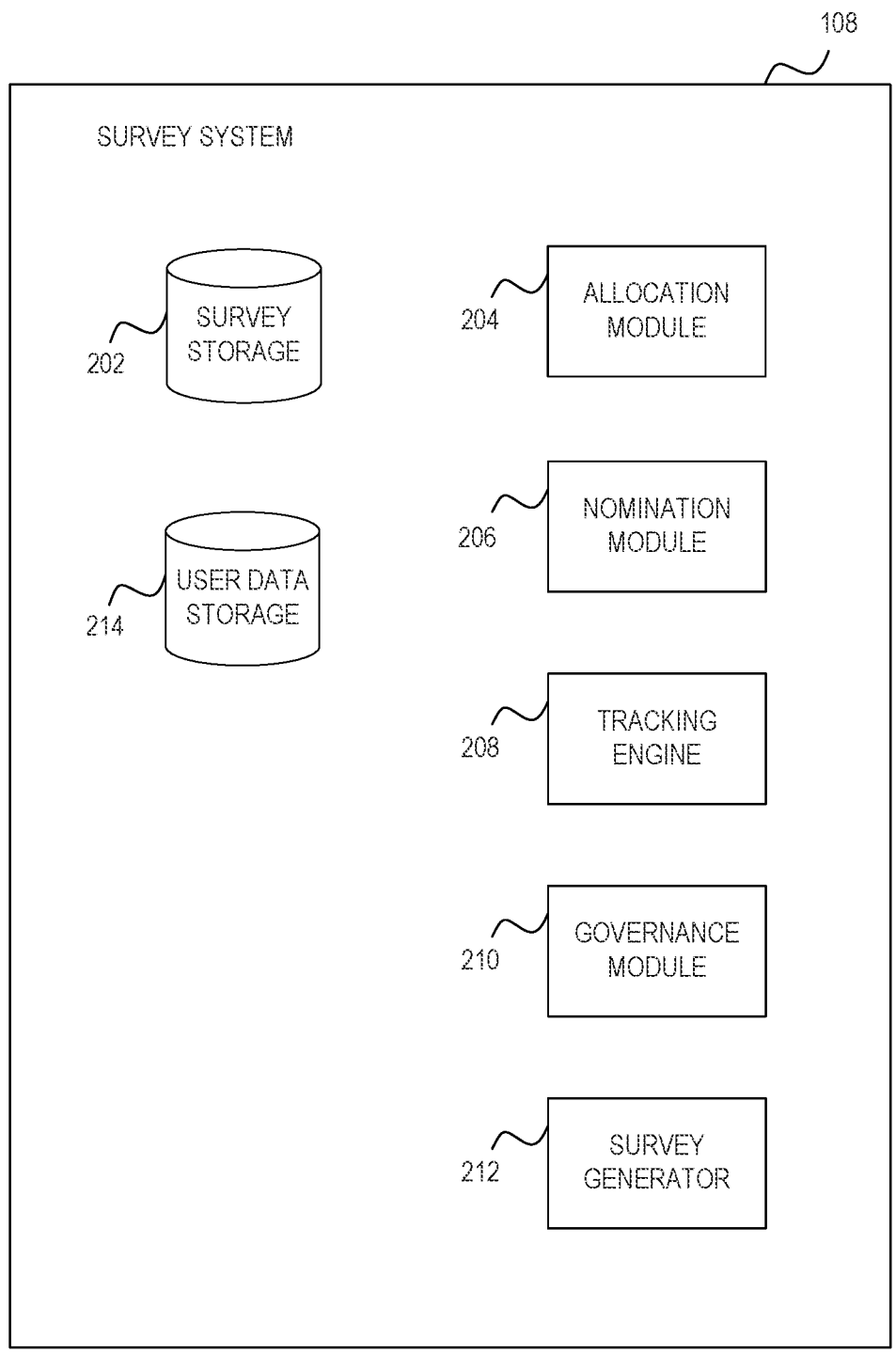
FIG. 2 is a diagram illustrating components of a survey system, according to some example embodiments.

FIG. 2 is a diagram illustrating components of the survey system 108, according to some example embodiments. In example embodiments, the survey system 108 is configured to manage surveys including determining to which users to send survey prompts, generating the survey prompts, and obtaining feedback to the survey prompts. To enable these operations, the survey system 108 comprises a survey storage 202, an allocation module 204, a nomination module 206, a tracking engine 208, a governance module 210, and a survey generator 212 all configured to communicate with each other (e.g., via a bus, shared memory, or a switch). Alternative embodiments may comprise more or less components, combine the functions of some these components into a single component, or making some components optional.

The survey storage 202 stores all survey campaigns used by the survey system 108. The survey campaigns can include past survey campaigns and current/future survey campaigns where an end date for completion of the survey campaign is a future date.

The allocation module 204 allocates users to survey campaigns. In example embodiments, the allocation module 204 accesses the survey campaigns in the survey storage 202 and identifies eligible survey campaigns with end dates in the future. The allocation module 204 then uses logic to determine whether a user is eligible for a survey. In one embodiment, the allocation module 204 filters based on, for example, application version, platform, audience or user type, and/or a hash-function that converts a user identifier/ client identifier into a number or percentage. This number is then compared to an allocation percentage. Additionally or alternatively, the allocation can be based on tenant identifier, client identifier, and/or session identifier. Once the users are allocated, the allocation module 204 may load a campaign state for each survey campaign of the eligible survey campaigns. The campaign state may include one or more optimized survey parameters that can be used to determine, for example, who should receive a survey prompt, when they should receive the survey prompt, and for how long. In some embodiments, the optimized survey parameters are obtained from the machine learning system 110 via a query.

The nomination module 206 selects the users who can potentially receive a survey prompt for a survey campaign. In example embodiments, each survey campaign may have an associated nomination process and nomination percentage (e.g., identified from the campaign state). The nomination percentage may represent a number of surveys to be sent in order to obtain a certain level of survey volume. In one embodiment, the nomination percentage can be a parameter that is optimized by the machine-learning system 110. The nomination module 206 selects a number of allocated users for each survey campaign based on the nomination percentage, which will be a fraction of the allocated users. The selection may be random or be based on other factors (e.g., level of usage, device/app combination). In some cases, a user can be nominated to receive a survey prompt for multiple survey campaigns.

Any non-nominated user is considered an "anti-candidate" and may enter a wait state or cooldown period in which they will not be nominated for another survey campaign for a certain amount of time. For example, the wait state may for 14 days. In some embodiments, the anti-candidate wait state parameter (e.g., 14 days) can be optimized by the machine learning system 110.

Once nominated for a survey campaign, activities of the nominated users are tracked by the tracking engine 208. In example embodiments, a survey is only presented to users that meet a trigger condition. In one example, the trigger condition is a usage criteria based on a minimum amount of active usage (e.g., 5 minutes) of the application associated with the survey campaign. In another example, the trigger condition is based on a sequence of actions (e.g., at least 5 minutes of usage and a reboot/restart of the application).

The tracking engine 208 tracks each nominated user's activities and determines if the user has satisfied the trigger condition within a nomination window. If the user does not satisfy the trigger condition before the nomination window expires, the user cannot trigger the survey and may be placed in a wait state/cooldown period. This wait state/cooldown period is also optimizable by the machine learning system 110.

If the trigger condition is met, a governance module 210 determines whether the user should receive the survey based on various timing parameters, each of which may be machine-learned. In example embodiments, the governance module 210 determines whether the user has already been a part of any other survey campaigns within a predetermined amount of time. This parameter is referred to as a global cooldown period, which indicates a number of days that the user should not be shown any other survey. The global cooldown period may be optimized by the machine learning system 110 in some embodiments.

The governance module 210 may also determine whether the user has already seen the same survey and should not be shown the same survey again for a period of time. This parameter is referred to as a campaign cooldown period. The campaign cooldown period may be optimized by the machine learning system 110 in some embodiments.

Additionally, once a user is nominated for the survey campaign, the user is placed in a nomination cooldown period. Here, the user will not be nominated for another survey based on this parameter, which may also be optimized using the machine learning system 110.

In an alternative embodiment, the governance module 210 may determine whether allocated or nominated users satisfy the various timing parameters (es., cool down periods) prior to any tracking of user activities by the tracking engine 208.

If the user satisfies the trigger condition and none of the cooldown periods apply, a survey prompt is provided to the user device 102 of the user. In example embodiments, the survey generator 212 will generate and provide the survey prompt to the user. In the simplest form, the survey prompt will ask the user if they are willing to answer one or more questions, and the survey generator 212 provides the survey if the response is affirmative. In some cases, the survey prompt can be the survey itself. Further still, different questions can be asked in the survey prompt. In these cases, the survey generator 212 may use user information (e.g., browsing history, demographics) and context of the survey to determine which of several questions should be asked. For example, if the survey prompt asks the user if they would like to buy an item, user information may indicate that the user is female and had been browsing shoe stores. In this example, the survey prompt may ask the user about a pair of boots instead of presenting a survey prompt regarding a sleeping bag.

The survey generator 212 will cause the survey prompt to be presented for a particular amount of time referred to as a prompt duration. If the prompt duration expires and the user has not accepted or rejected the survey prompt, the survey prompt is dismissed (e.g., removed from display on the user device 102). The prompt duration is another parameter that may be optimized by the machine learning system 110. In some embodiments, the survey generator 212 obtains the prompt duration from the campaign state and/or via a query to the machine learning system 110.

The user's response or lack of response to the survey prompt is monitored (e.g., by the tracking engine 208). In one embodiment, the response along with context features and survey features of the survey is stored to a user data storage 214. The context features can include, for example, an application identifier (e.g., Word, Excel, PowerPoint), a platform (e,g., web, Win32 iOs), a user segment (e.g., consumer, commercial, educational), language or country, session duration, time of day, day of week or month, and/or month of year. The survey features can comprise parameters of the survey including the prompt duration, nomination percentage, one or more of the cool down periods, and the trigger condition, The response along with context features and survey features (collectively referred to as feedback) are used by the machine learning system 110 to refine the machine learning model.

Figure 3:
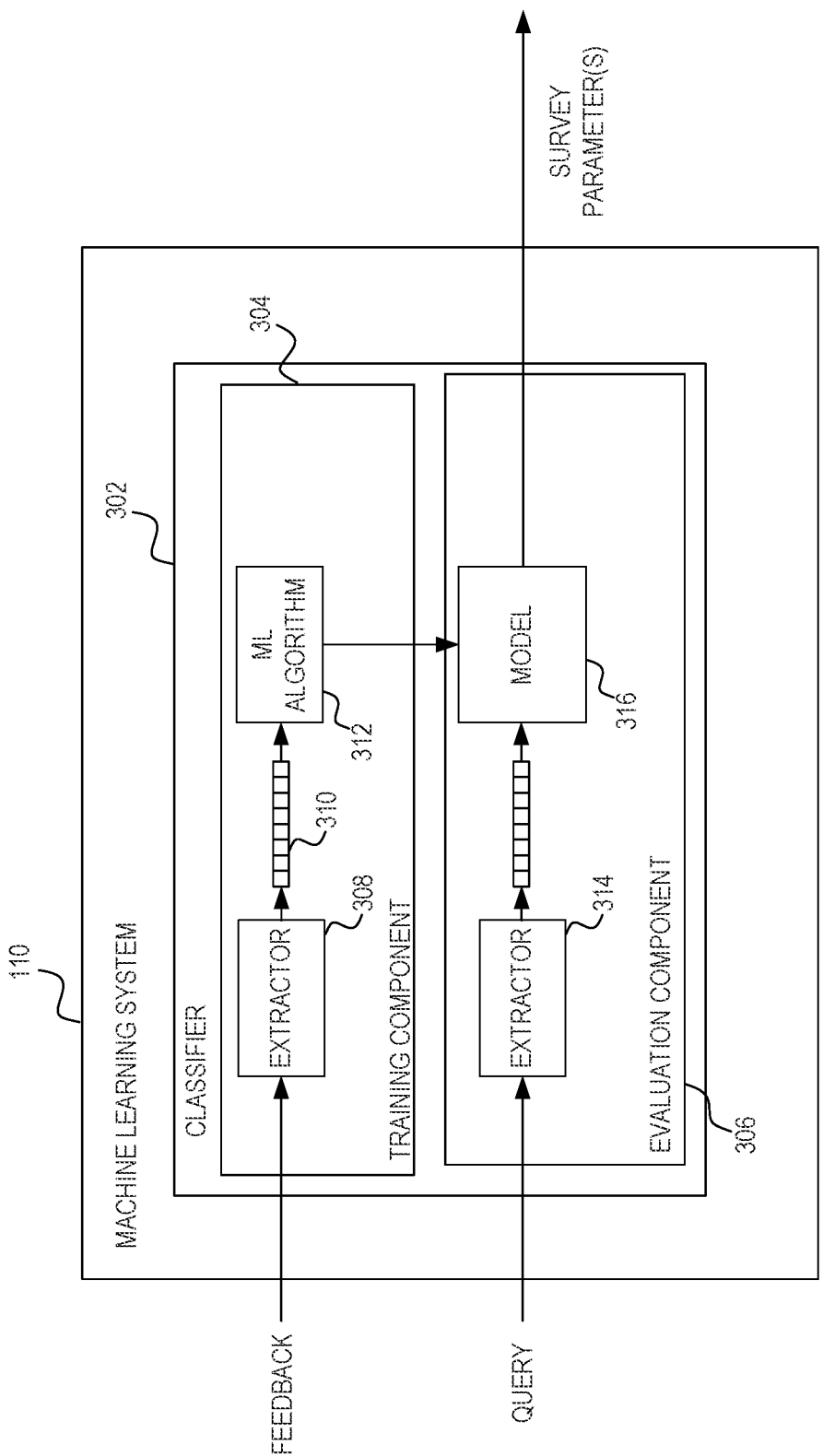
FIG. 3 is a diagram illustrating components of a machine learning system, according to some example embodiments.

FIG. 3 is a block diagram illustrating components of the machine learning system 110, according to some example embodiments. The machine learning system 110 is configured to train a classifier 302, which during runtime, determines one or more survey parameters to apply to a survey campaign. To enable these operations, the machine learning system 110 includes one or more classifiers 302 that includes a training component 304 and an evaluation component 306. The machine learning system 110 may comprise other components (not shown) that are not pertinent to example embodiments.

In example embodiments, the training component 304 uses a feature extractor 308 to extract one or more features 310 from the feedback (e.g., response to survey, context feature, and survey features) from a previous survey campaign. For each survey, the feature extractor 308 extracts features including whether the user accepted, rejected, or ignored the survey (e.g., the response) and context features such as the platform; application identifier; language; country; and/or time of day, week, or month. The feature extractor 308 may also extract survey features or parameters used, such as cooldown periods, prompt duration, and/or trigger conditions.

The features 310 may then be fed to a machine learning algorithm 312 that trains a model 316. The data (e.g., features) used by the machine learning algorithm 312 may vary based on the parameter that is being optimized. Features could include, but are not limited to, Apps Name, Country, Language, Time of Day, or Day of Week.

In one example, the machine learning algorithm 312 trains the model 316 to optimize on prompt duration (e.g., how long a survey prompt is visible on a screen) Various different values for the prompt duration may be used by the survey system 108 to determine what will illicit the most accepts of the survey prompt. In this example, an acceptance of the survey prompt is a positive reward; an ignore of the survey prompt is neutral; and a rejection of the survey prompt is a negative reward, whereby the machine learning algorithm 312 attempts to maximize a summation of the rewards. Thus, for every survey campaign, the machine learning algorithm 312 attempts to optimize such that a probability of obtaining an accept response is maximized.

In another example, the machine learning algorithm 312 trains the model 316 to optimize a usage criteria based on a type of user. Most survey campaigns have a trigger where the user can only see the survey if the user has used the application for a certain period of time over a predetermined duration (e.g., a month). However, user patterns can be very different for a commercial versus an educational on different applications. As such, a usage criteria threshold (e.g, 5 minutes) may fit a typical user (e.g., a commercial user) in one context, but ignore or accidentally exclude many users in a different context (e.g., educational user) where the average use may he lower.

Thus, the model 316 can be specifically trained, for example, for a specific campaign, application, platform, country, type of user, any other feature/parameter associated with a survey or context, and/or any combination of these. For example, the model 316 can be trained for a particular application (e.g., the trained model 316 may determine that for Word, the optimal prompt duration is 28 seconds, but for Excel and PowerPoint, the optimal prompt duration is 90 seconds). In another example, the model 316 can he trained for a combination of context (e.g., Word in English, Excel in Japan in an educational environment).

During runtime, the machine learning system 110 is configured to provide one or more optimized parameters using the evaluation component 306 of the classifier 302. In example embodiments, the evaluation component 306 receives a query associated with a survey campaign. The query may include information regarding the survey campaign such as a platform it will be used on, an application that the survey will be presented in, a language, and/or country in which the survey will be presented.

In example embodiments, a feature extractor 314 of the evaluation component 306 receives the query and extracts features from the query. The features can include the information regarding the survey campaign (e.g., platform, application, language, country). The features are then passed to the model 316, which then outputs the one or more optimized survey parameters to be applied to the survey campaign. The survey parameter(s) are provided to the survey system 108, which applies the survey parameters) to a current survey campaign.

Figure 4:
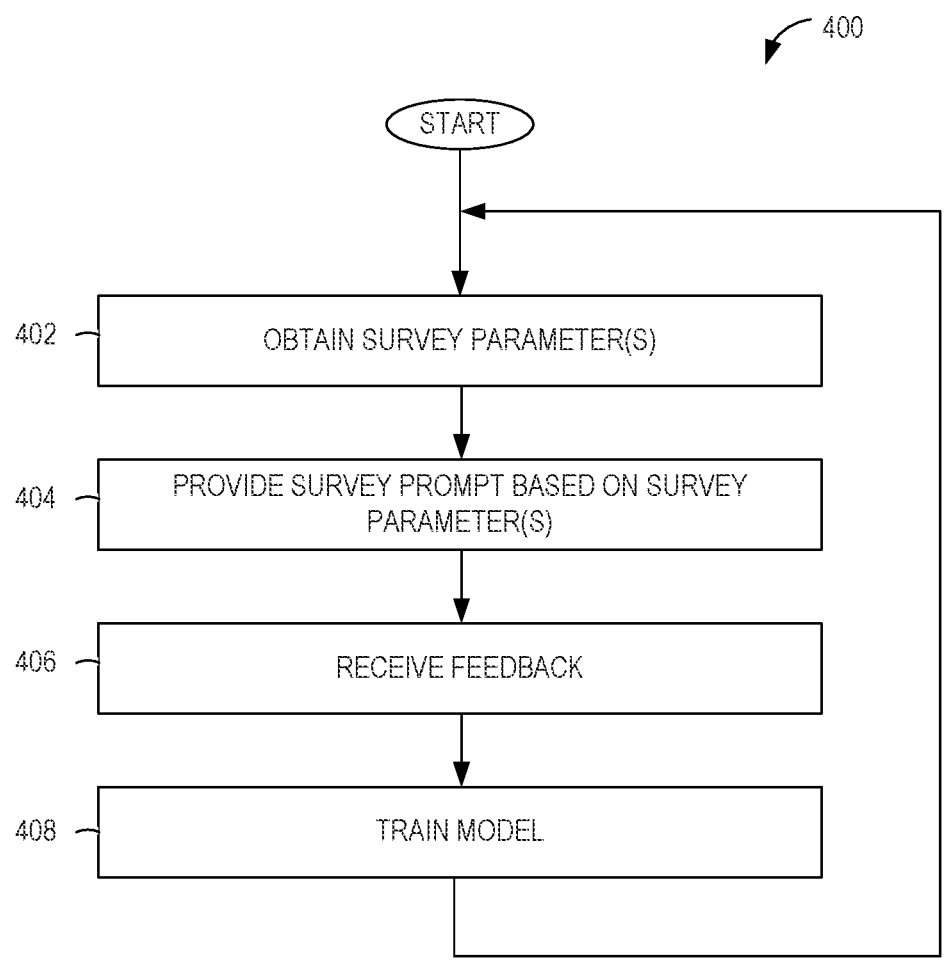
FIG. 4 is a flowchart illustrating operations of a method for providing survey prompts and optimizing survey parameters, according to some example embodiments.

FIG. 4 is a flowchart illustrating operations of a method 400 for providing survey prompts and optimizing survey parameters, according to some example embodiments. Operations in the method 400 may be performed by the network system 106 in the network environment 100 described above with respect to FIG. 1 FIG. 3. Accordingly, the method 400 is described by way of example with reference to these components in the network system 106. However, it shall be appreciated that at least some of the operations of the method 400 may be deployed on various other hardware configurations or be performed by similar components residing elsewhere in the network system 106. Therefore, the method 400 is not intended to be limited to these components.

In operation 402, the survey system 108 obtains survey parameter(s). In example embodiments, the survey system 108 may send a query associated with a survey campaign to the machine learning system 110 (e.g., evaluation component 306). The query may include information regarding the survey campaign such as, for example, a platform it will be used on, an application that the survey will be presented in, and so forth. The machine learning system 110 extracts features from the query. The features can include information regarding the survey campaign (e.g., platform, application, language, country). These features are applied to the model 316, which determines optimized survey parameter (s). These survey parameter(s) are provided to the survey system 108, which may apply one or more of the survey parameters to a current survey campaign.

In operation 404, the survey system 108 provides a survey prompt based on and/or using the survey parameter(s). Operation 404 will be discussed in more detail in connection with FIG. 5 below.

In operation 406, the survey system 108 receives feedback from the survey prompt presented to each user. The feedback includes an indication of acceptance of the survey prompt (e.g., selection of an icon on the survey prompt to accept the survey or provide a response to the survey). Alternatively, the feedback can include an indication of rejection of the survey prompt (e.g., selection of an icon on the survey prompt to reject the survey). Further still, the feedback can indicate that the user ignored the survey prompt. When ignored, the survey prompt is displayed for a display duration without the user accepting or rejecting the survey prompt.

In operation 408, the feedback is used to train (or retrain) the machine learning model 316. The training or retraining will refine one or more of the survey parameters to optimize for a higher rate of acceptance of the survey prompt in the future. Operation 408 will be discussed in more detail in connection with FIG. 6 below. Once the model 316 is retrained, the model 316 is used to provide a next set of one or more survey parameters in operation 402.

Figure 5:
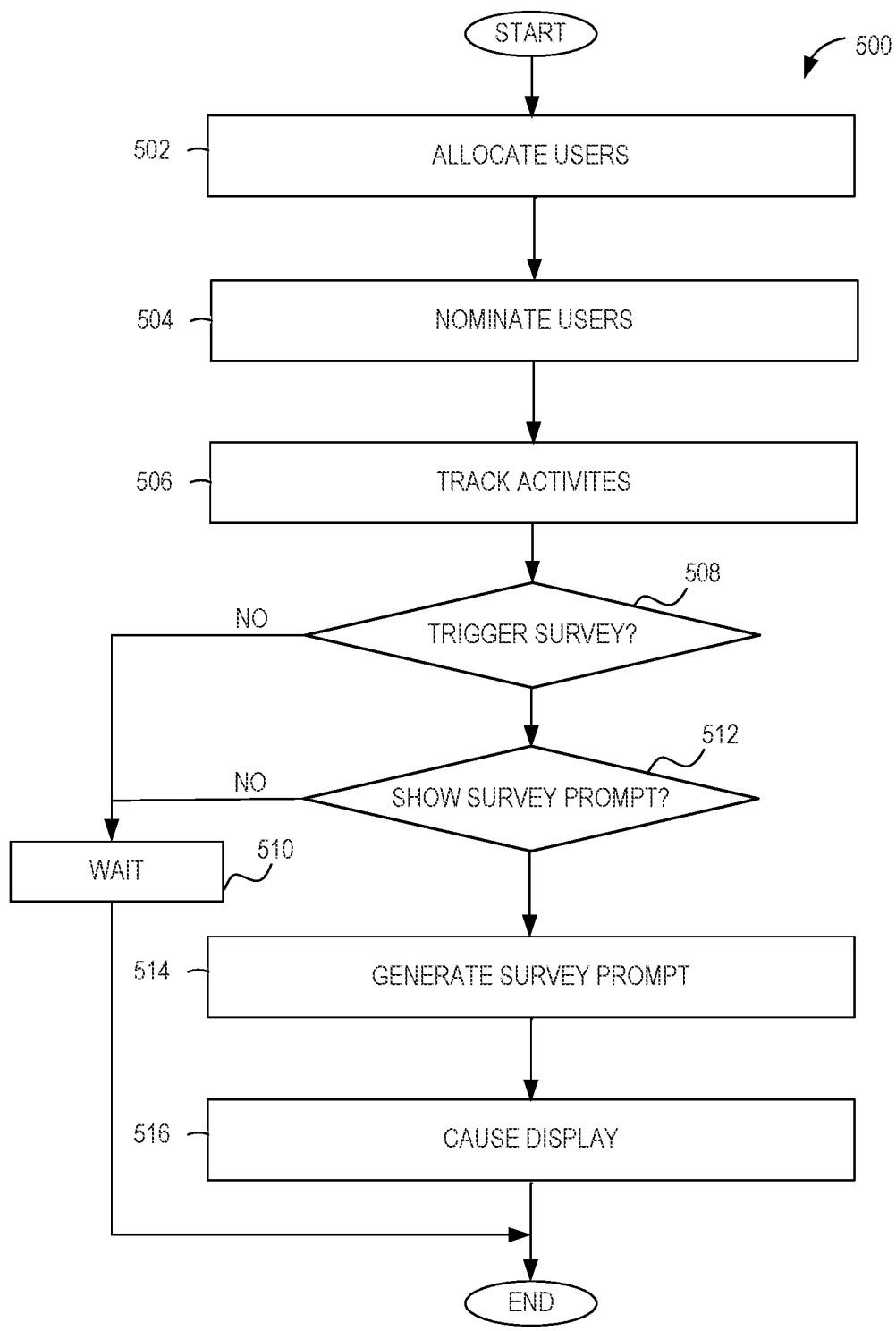
FIG. 5 is a flowchart illustrating operations of a method for providing survey prompts, according to some example embodiments.

FIG. 5 is a flowchart illustrating operations of a method 500 for providing survey prompts, according to sonic example embodiments. Operations in the method 500 may be performed by the survey system 108, using components described above with respect to FIG. 2. Accordingly, the method 500 is described by way of example with reference to the survey system 108. However, it shall be appreciated that at least some of the operations of the method 500 may be deployed on various other hardware configurations or be performed by similar components residing elsewhere in the network environment 100. Therefore, the method 500 is not intended to be limited to the survey system 108. The method 500 may include operations 402 and 404.

In operation 502, the allocation module 204 allocates users to survey campaigns. In example embodiments, the allocation module 204 accesses the survey campaigns in the survey storage 202 and identifies eligible survey campaigns with end dates in the future. Users are then allocated to the eligible survey campaigns. Once the users are allocated, the allocation module 204 may load a campaign state for each eligible survey campaign. The campaign state may include survey parameters, one or more of which may be optimized by the machine learning system 110. In some embodiments, the survey system 108 obtains one or more of the survey parameters by providing a query to the machine learning system 110.

In operation 504, the nomination module 206 nominates users to receive each survey campaign. In example embodiments, each survey campaign may have an associated nomination process and nomination percentage. The nomination module 206 selects a number of allocated users for each survey campaign based on the nomination percentage. The selection may be random or be based on other factors (e.g., level of use, device type, user type).

In operation 506, the tracking engine 208 tracks activities of the nominated users. In example embodiments, a survey prompt is only presented to users that meet a trigger condition, such as a usage criteria based on a minimum amount of usage (e.g., 5 minutes) or based on a sequence of actions (e.g., at least 5 minutes of usage and a reboot of the application).

The tracking engine 208 determines if/when the user has satisfied the trigger condition. In operation 508, a determination is made whether a survey prompt is triggered based on the trigger condition being met. If a survey prompt is not triggered, then the user enters a wait state or cooldown period in operation 510. For instance, the user may not be eligible for another survey/survey prompt for 14 days.

If the trigger condition is met, then in operation 512, a determination is made whether to show a survey prompt. Once the trigger condition is met, the governance module 210 determines whether the user should receive the survey prompt based on various timing parameters, each of which may be machine-learned. For example, the governance module 210 determines whether the user has already been a part of any other survey campaigns within a predetermined amount of time (e.g., a global cooldown period). The governance module 210 may also determine whether the user has already seen the same survey campaign and should not be shown the same survey campaign again for a period of time (e.g., a campaign cooldown period). If a determination is made to not show the survey prompt, the user enters the wait state or cooldown period in operation 510.

If the user satisfies the trigger condition and none of the cooldown periods apply, a survey prompt is generated in operation 514. In embodiments where the survey prompt has different questions that can be asked, the survey generator 212 may use user information (e.g., browsing history, demographics) and context of the survey to determine which question(s) should be asked.

In operation 516, the survey prompt is displayed to the user on their respective user device 102. In example embodiments, the survey generator 212 will cause the survey prompt to be presented for a prompt duration. The prompt duration is another parameter that may be optimized by the machine learning system 110. After the prompt duration is passed and the user has not accepted or rejected the survey prompt, the survey prompt will be dismissed (e.g., removed from display on the user device 102).

It is noted that the method 500 is merely an example. Alternative embodiments may remove some operations or make some operations optional. Additionally, the order of the operations in the method 500 may be changed.

Figure 6:
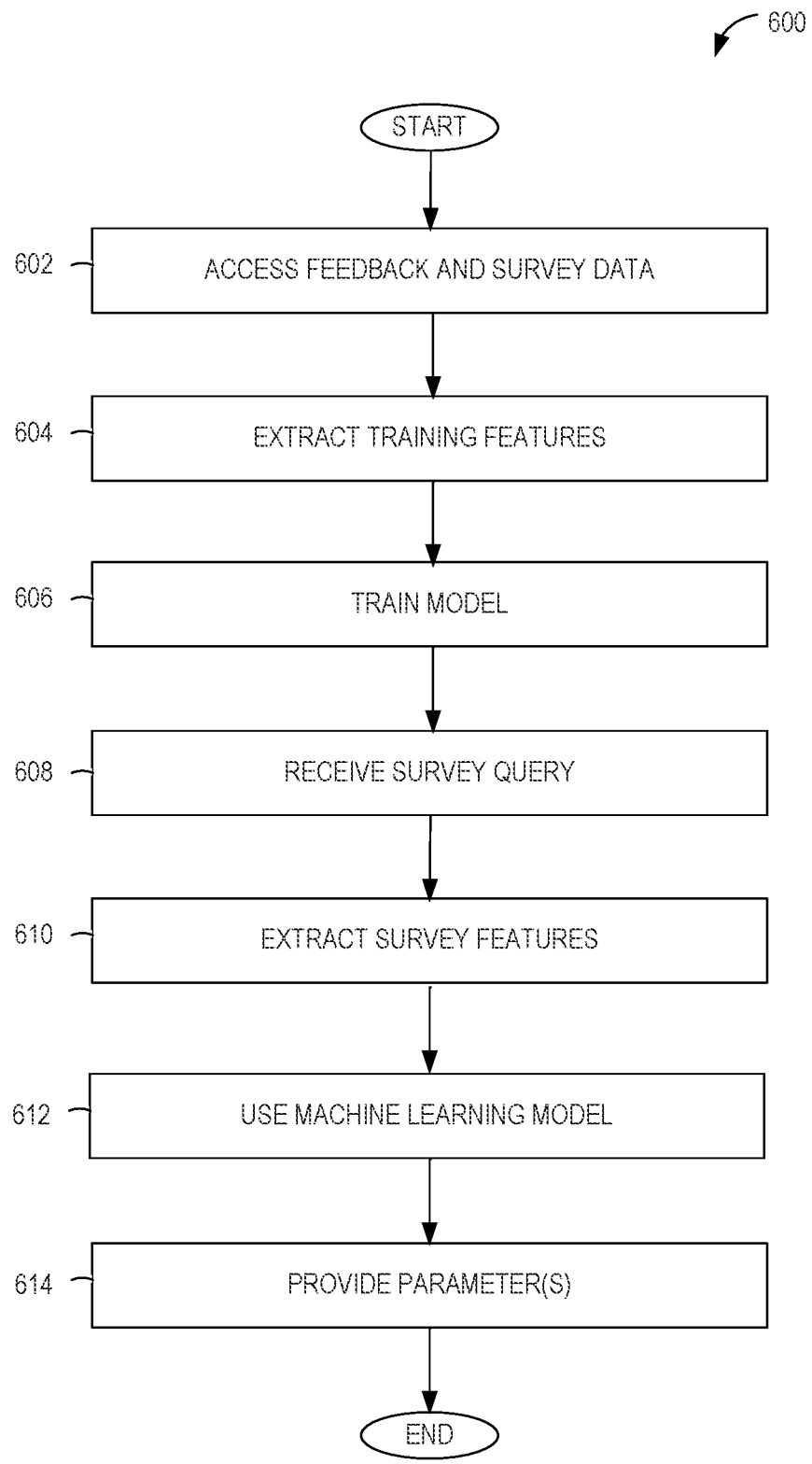
FIG. 6 is a flowchart illustrating operations of a method for generating and using a machine learning model to optimize survey parameters, according to some example embodiments.

FIG. 6 is a flowchart illustrating operations of a method 600 for generating and using a machine learning model (e.g., model 316) to optimize survey parameters, according to some example embodiments. Operations in the method 600 may be performed by the machine learning system 110, using components described above with respect to FIG. 3. Accordingly, the method 600 is described by way of example with reference to the machine learning system 110. However, it shall be appreciated that at least some of the operations of the method 600 may be deployed on various other hardware configurations or be performed by similar components residing elsewhere in the network environment 100. Therefore, the method 600 is not intended to be limited to the machine learning system 110.

In operation 602, the machine learning system 110 accesses feedback (e.g., acceptance, rejection, or ignore signal; survey parameters used; context). In some cases, the information may be accessed from the user data storage 214.

In operation 604, the feature extractor 308 extracts survey features 310 from the feedback (e.g., response to survey prompt, context feature, survey parameters) for a previous survey campaign. Thus, for each survey campaign, the feature extractor 308 extracts features including an indication of whether the user accepted, rejected or ignored the survey prompt and context features such as the platform; application identifier; language; country; and/or time of day, week, or month. The feature extractor 308 may also extract survey parameters such as cool down periods, prompt duration, and/or trigger condition.

In operation 606, a machine learning model is trained by the machine learning algorithm 312. In example embodiments, the extracted features are provided to the machine learning algorithm 312. The data (e.g., features) used by the machine learning algorithm 312 to optimize one or more parameters varies based on the parameter(s) being optimized. For example, the features can include time of day, day of week or month, tenant ID, country, language, locale, and/or anything else known about user in any combination. In one example, the machine learning algorithm 312 trains the model 316 to optimize on prompt duration (e.g., how long a survey prompt is visible on a screen). In another example, the machine learning algorithm 312 trains the model 316 to optimize a usage criteria based on a type of user. The model may be optimized for other survey parameters, such as cooldown periods.

During runtime, the machine learning system 110 may receive a query in operation 608. In example embodiments, the evaluation component 306 receives the query associated with a survey campaign. The query may include information regarding survey campaign such as a platform it will be used on, an application that the survey will be presented in, a language, and/or country in which the survey will be presented.

In operation 610, the feature extractor 314 of the evaluation component 306 extracts survey features from the query. The features can include information regarding the survey campaign (e.g., platform, application, language, country).

In operation 612, the machine learning model is used to determine parameters. In example embodiments, the extracted features are applied to the model 316, which outputs the one or more optimized survey parameters to be used in the survey campaign.

In operation 614, the survey parameter(s) are provided to the survey system 108, which applies the survey parameter(s) to a current survey campaign.

While example embodiments have been discussed with reference to a survey environment, example embodiments can be utilized in non-survey environments. The survey prompt may be any type of notification that is presented to a user with which a response is requested. For example, example embodiments can be used to provide an advertisement that provides one or more selectable options, has a prompt duration, and is associated with cooldown periods and usage criteria.

Figure 7:
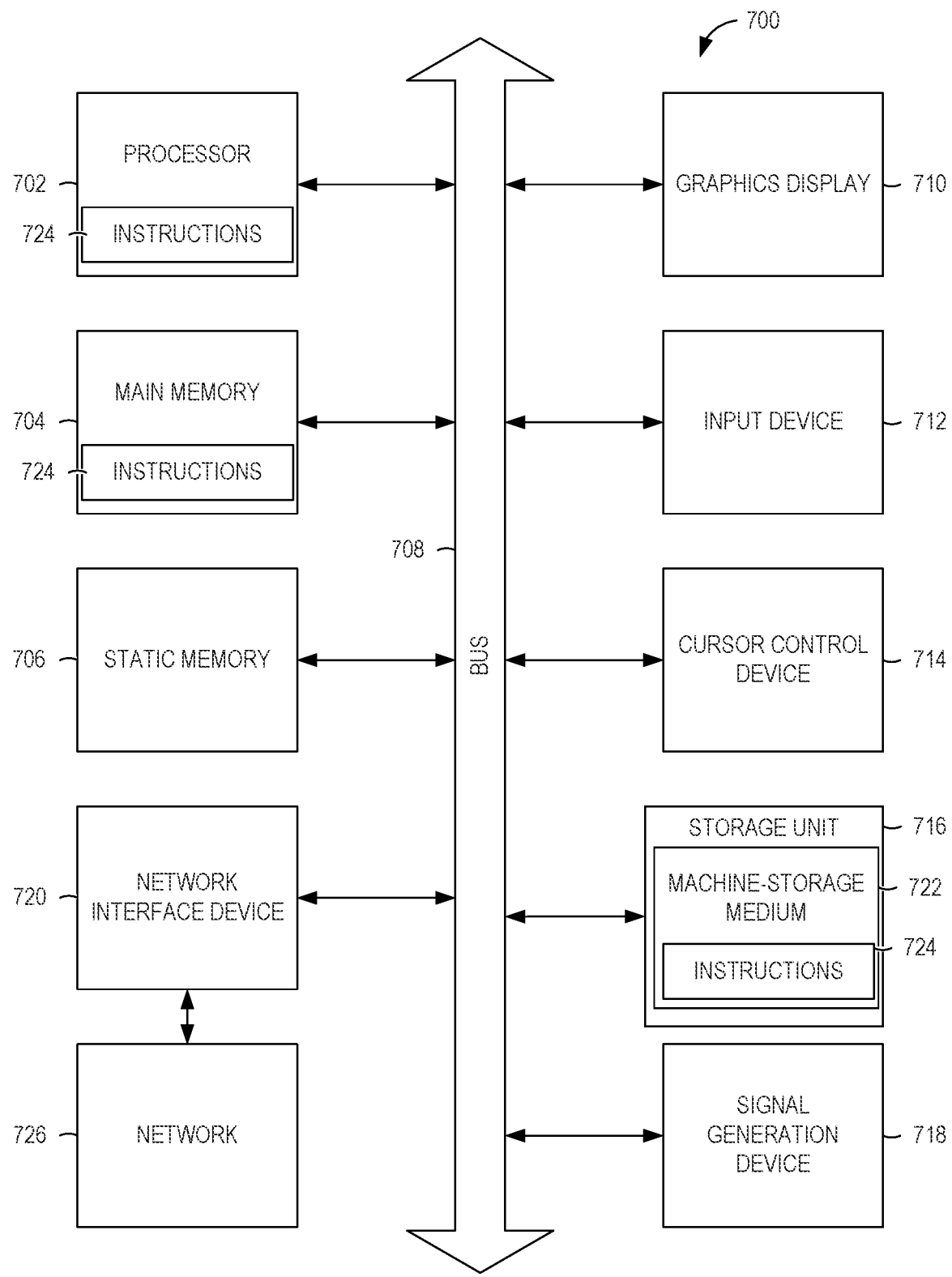
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 4 to FIG. 6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (APD).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for optimizing survey parameters using machine learning. The method is performed by one or more hardware processors and comprises monitoring, by a network system, user activity of a plurality of users with respect to an application; providing, by the network system, a notification to users of the plurality of users that satisfy a trigger condition for providing the notification; obtaining feedback corresponding to the notification, the feedback indicating whether each of the users accepted, rejected, or ignored the notification; training, by the network system, a machine learning model using input data obtained from the feedback to optimize on one or more parameters used by the network system in providing a future notification; and based on the machine learning model, causing presentation of the future notification to a further set of users using the one or more optimized parameters.

In example 2, the subject matter of example 1 can optionally include wherein the notification comprises a survey prompt.

In example 3, the subject matter of any of examples 1-2 can optionally include wherein training the machine learning model comprises extracting features from the feedback, the extracted features including an indication of whether the notification was accepted, rejected, or ignored; and using the extracted features to train the machine learning model.

In example 4, the subject matter of any of examples 1-3 can optionally include wherein the extracted features further include one or more context features, the context features including an application identifier, a language, a country, a time of day, a day of a week, or a day of a month.

In example 5, the subject matter of any of examples 1-4 can optionally include wherein the extracted features further include one or more survey features, the survey features including a cooldown period, a prompt direction, or the trigger condition.

In example 6, the subject matter of any of examples 1-5 can optionally include wherein the causing presentation of the future notification comprises receiving a query for the one or more parameters, the query including information regarding a next survey campaign; and applying features associated with the query to the machine learning model to obtain the one or more optimized parameters.

In example 7, the subject matter of any of examples 1-6 can optionally include wherein the trigger condition comprises a usage criteria indicating a minimum amount of usage of the application, the usage criteria being an optimizable parameter.

In example 8, the subject matter of any of examples 1-7 can optionally include wherein the providing the notification comprises causing presentation of the notification for a prompt duration, the prompt duration being an optimizable parameter.

In example 9, the subject matter of any of examples 1-8 can optionally include determining that the set of users are not in a cooldown period that prevents providing the notification, the cooldown period being an optimizable parameter.

Example 10 is a system for optimizing survey parameters using machine learning. The system comprises one or more hardware processors and a memory storing instructions that, when executed by the one or more hardware processors, cause the one or more hardware processors to perform operations comprising monitoring user activity of a plurality of users with respect to an application; providing a notification to users of the plurality of users that satisfy a trigger condition for providing the notification; obtaining feedback corresponding to the notification, the feedback indicating whether each of the users accepted, rejected, or ignored the notification; training a machine learning model using input data obtained from the feedback to optimize on one or more parameters used by a network system in providing a future notification; and based on the machine learning model, causing presentation of the future notification to a further set of users using the one or more optimized parameters.

In example 11, the subject matter of example 10 can optionally include wherein the notification comprises a survey prompt.

In example 12, the subject matter of any of examples 10-11 can optionally include wherein training the machine learning model comprises extracting features from the feedback, the extracted features including an indication of whether the notification was accepted, rejected, or ignored; and using the extracted features to train the machine learning model.

In example 13, the subject matter of any of examples 10-12 can optionally include wherein the extracted features further include one or more context features, the context features including an application identifier, a language, a country, a time of day, a day of a week, or a day of a month.

In example 14, the subject matter of any of examples 10-13 can optionally include wherein the extracted features further include one or more survey features, the survey features including a cooldown period, a prompt direction, or the trigger condition.

In example 15, the subject matter of any of examples 10-14 can optionally include wherein the causing presentation of the future notification comprises receiving a query for the one or more parameters, the query including information regarding a next survey campaign; and applying features associated with the query to the machine learning model to obtain the one or more optimized parameters.

In example 16 the subject matter of any of examples 10-15 can optionally include wherein the trigger condition comprises a usage criteria indicating a minimum amount of usage of the application, the usage criteria being an optimizable parameter.

In example 17, the subject matter of any of examples 10-16 can optionally include wherein the providing the notification comprises causing presentation of the notification for a prompt duration, the prompt duration being an optimizable parameter.

In example 18, the subject matter of any of examples 10-17 can optionally include wherein the operations further comprise determining that the set of users are not in a cooldown period that prevents providing the notification, the cooldown period being an optimizable parameter.

Example 19 is a computer-storage medium comprising instructions which, when executed by one or more hardware processors of a machine, cause the machine to perform operations for optimizing survey parameters using machine learning. The operations comprise monitoring user activity of a plurality of users with respect to an application; providing a notification to users of the plurality of users that satisfy a trigger condition for providing the notification; obtaining feedback corresponding to the notification, the feedback indicating whether each of the users accepted, rejected, or ignored the notification; training a machine learning model using input data obtained from the feedback to optimize on one or more parameters used by a network system in providing a future notification; and based on the machine learning model, causing presentation of the future notification to a further set of users using the one or more optimized parameters.

In example 20, the subject matter of example 19 can optionally include wherein the notification comprises a survey prompt.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   training, by a network system using input data obtained from feedback indicating whether users accepted, rejected, or ignored a past notification, a machine learning model that provides one or more parameters used by the network system in providing a notification, the training comprising:
   extracting features from the feedback, the extracted features including an indication of whether the notification was accepted, rejected, or ignored, the extracted features further including one or more context features, the context features including an application identifier, a language, a country, a time of day, a day of a week, or a day of a month; and
   using the extracted features to train the machine learning model, wherein acceptance is a positive reward, rejection is a negative reward, and ignoring is neutral, the training maximizing a summation of rewards;
   identifying a plurality of users nominated by the network system to receive the notification;
   monitoring, by the network system, user activity of the plurality of users with respect to an application;
   based on the monitoring, identifying users of the plurality of users that satisfy a trigger condition within a nomination window, and placing users that do not satisfy the trigger condition in a cooldown period;

based on user information of each of the users that satisfy the trigger condition and context of the notification, selecting content from a plurality of different content to present to each of the users that satisfy the trigger condition;

causing presentation of the notification with the selected content to each of the users that satisfy the trigger condition;

obtaining further feedback corresponding to the notification, the further feedback indicating whether each of the users that received the notification accepted, rejected, or ignored the notification;

retraining, by the network system, the machine learning model using input data obtained from the further feedback to optimize on the one or more parameters used by the network system in providing a future notification; and based on the retrained machine learning model, causing presentation of the future notification to a further set of users using the one or more optimized parameters.

2. The method of claim 1, wherein the notification comprises a survey prompt, wherein selecting content from the plurality of different content comprises selecting a question from a plurality of questions to present to each of the users that satisfy the trigger condition.

3. The method of claim 1, wherein the extracted features further include one or more survey features, the survey features including a cooldown period, a prompt duration, or the trigger condition.

4. The method of claim 1, wherein the causing presentation of the future notification comprises:
receiving a query for the one or more parameters, the query including information regarding a next survey campaign; and
applying features associated with the query to the machine learning model to obtain the one or more optimized parameters.

5. The method of claim 1, wherein the trigger condition comprises a usage criteria indicating a minimum amount of usage of the application, the usage criteria being an optimizable parameter that differs for different types of users.

6. The method of claim 1, wherein the providing the notification comprises causing presentation of the notification for a prompt duration, the prompt duration being an optimizable parameter.

7. The method of claim 1, wherein the trigger condition comprises a sequence of actions performed by a user on the application.

8. A system comprising:
one or more hardware processors; and
a memory storing instructions that, when executed by the one or more hardware processors, cause the one or more hardware processors to perform operations comprising:
training, using input data obtained from feedback indicating whether users accepted, rejected, or ignored a past notification, a machine learning model that provides one or more parameters used by a network system in providing a notification, the training comprising:
extracting features from the feedback, the extracted features including an indication of whether the notification was accepted, rejected, or ignored, the extracted features further including one or more context features, the context features including an application identifier, a language, a country, a time of day, a day of a week, or a day of a month; and
using the extracted features to train the machine learning model, wherein acceptance is a positive reward, rejection is a negative reward, and ignoring is neutral, the training maximizing a summation of rewards;
identifying a plurality of users nominated to receive the notification;
monitoring user activity of the plurality of users with respect to an application;
based on the monitoring, identifying users of the plurality of users that satisfy a trigger condition within a nomination window and placing users that do not satisfy the trigger condition in a cooldown period;
based on user information of each of the users that satisfy the trigger condition and context of the notification, selecting content from a plurality of different content to present to each of the users that satisfy the trigger condition;
causing presentation of the notification with the selected content to each of the users that satisfy the trigger condition;
obtaining further feedback corresponding to the notification, the further feedback indicating whether each of the users that received the notification accepted, rejected, or ignored the notification;
retraining the machine learning model using input data obtained from the further feedback to optimize on the one or more parameters used by the network system in providing a future notification; and
based on the retrained machine learning model, causing presentation of the future notification to a further set of users using the one or more optimized parameters.

9. The system of claim 8, wherein the notification comprises a survey prompt, wherein selecting content from the plurality of different content comprises selecting a question from a plurality of questions to present to each of the users that satisfy the trigger condition.

10. The system of claim 8, wherein the extracted features further include one or more survey features, the survey features including a cooldown period, a prompt duration, or the trigger condition.

11. The system of claim 8, wherein the causing presentation of the future notification comprises:
receiving a query for the one or more parameters, the query including information regarding a next survey campaign; and
applying features associated with the query to the machine learning model to obtain the one or more optimized parameters.

12. The system of claim 8, wherein the trigger condition comprises a usage criteria indicating a minimum amount of usage of the application, the usage criteria being an optimizable parameter that differs for different types of users.

13. The system of claim 8, wherein the providing the notification comprises causing presentation of the notification for a prompt duration, the prompt duration being an optimizable parameter.

14. The system of claim 8, wherein the trigger condition comprises a sequence of actions performed by a user on the application.

15. A computer-storage medium comprising instructions which, when executed by one or more hardware processors of a machine, cause the machine to perform operations comprising:
training, using input data obtained from feedback indicating whether users accepted, rejected, or ignored a past notification, a machine learning model that provides one or more parameters used by a network system in providing a notification, the training comprising:

extracting features from the feedback, the extracted features including an indication of whether the notification was accepted, rejected, or ignored, the extracted features further including one or more context features, the context features including an application identifier, a language, a country, a time of day, a day of a week, or a day of a month; and using the extracted features to train the machine learning model, wherein acceptance is a positive reward, rejection is a negative reward, and ignoring is neutral, the training maximizing a summation of rewards;

identifying a plurality of users nominated to receive the notification;

monitoring user activity of the plurality of users with respect to an application;

based on the monitoring, identifying users of the plurality of users that satisfy a trigger condition within a nomination window and placing users that do not satisfy the trigger condition in a cooldown period;

based on user information of each of the users that satisfy the trigger condition and context of the notification, selecting content from a plurality of different content to present to each of the users that satisfy the trigger condition;

causing presentation of the notification with the selected content to each of the users that satisfy the trigger condition;

obtaining further feedback corresponding to the notification, the further feedback indicating whether each of the users that received the notification accepted, rejected, or ignored the notification;

retraining the machine learning model using input data obtained from the further feedback to optimize on the one or more parameters used by the network system in providing a future notification; and based on the retrained machine learning model, causing presentation of the future notification to a further set of users using the one or more optimized parameters.

16. The computer-storage medium of claim 15, wherein the notification comprises a survey prompt, wherein selecting content from the plurality of different content comprises selecting a question from a plurality of questions to present to each of the users that satisfy the trigger condition.

* * * * *